United States Patent
Joneja

(10) Patent No.: US 12,197,395 B2
(45) Date of Patent: Jan. 14, 2025

(54) ACCESSING OBJECTS IN HOSTED STORAGE

(71) Applicant: Google LLC, Mountain View, CA (US)

(72) Inventor: Navneet Joneja, Issaquah, WA (US)

(73) Assignee: Google LLC, Mountain View, CA (US)

( * ) Notice: Subject to any disclaimer, the term of this patent is extended or adjusted under 35 U.S.C. 154(b) by 300 days.

(21) Appl. No.: 17/184,524

(22) Filed: Feb. 24, 2021

(65) Prior Publication Data

US 2021/0200723 A1 Jul. 1, 2021

Related U.S. Application Data

(63) Continuation of application No. 16/020,956, filed on Jun. 27, 2018, now Pat. No. 10,956,376, which is a continuation of application No. 13/757,093, filed on Feb. 1, 2013, now abandoned.

(51) Int. Cl.
| | |
|---|---|
| G06F 16/182 | (2019.01) |
| G06F 16/11 | (2019.01) |
| G06F 16/13 | (2019.01) |
| G06F 16/16 | (2019.01) |
| G06F 21/62 | (2013.01) |

(52) U.S. Cl.
CPC ........ *G06F 16/1824* (2019.01); *G06F 16/113* (2019.01); *G06F 16/13* (2019.01); *G06F 16/168* (2019.01); *G06F 21/6218* (2013.01); *G06F 2221/2141* (2013.01)

(58) Field of Classification Search
CPC .............. G06F 16/1824; G06F 16/168; G06F 16/113; G06F 16/13; G06F 21/6218; G06F 2221/2141
USPC .......................................................... 707/785
See application file for complete search history.

(56) References Cited

U.S. PATENT DOCUMENTS

| | | | |
|---|---|---|---|
| 5,724,530 A * | 3/1998 | Stein ...................... | G06Q 10/10 709/211 |
| 6,029,160 A * | 2/2000 | Cabrera .............. | G06F 21/6227 |
| 6,041,324 A * | 3/2000 | Earl .......................... | H04L 9/40 707/E17.115 |
| 6,427,149 B1 | 7/2002 | Rodriguez et al. | |
| 6,539,396 B1 | 3/2003 | Bowman-Amuah | |
| 6,879,988 B2 | 4/2005 | Basin et al. | |
| 7,318,229 B1 | 1/2008 | Connor et al. | |
| 7,516,285 B1 | 4/2009 | Haynes et al. | |

(Continued)

OTHER PUBLICATIONS

Mattmann, Chris, et al., "Experiments with Storage and Preservation of NASA's Planetary Data via the Cloud", IT Professional, vol. 12, Issue 5, Sep.-Oct. 2010, pp. 28-35.*

(Continued)

*Primary Examiner* — Robert Stevens
(74) *Attorney, Agent, or Firm* — Honigman LLP; Brett A. Krueger

(57) ABSTRACT

A hosted storage system receives a storage request that includes a single object and conforms to an API implemented by the hosted storage system. The API is designed to only support a single object in a storage request. The hosted storage system, in response to determining that the single object is an archive file, extracts each of the bundled files from the archive file and stores each of the extracted files in the hosted storage system such that each of the extracted files is separately accessible by the client system over the network.

18 Claims, 8 Drawing Sheets

(56) References Cited

U.S. PATENT DOCUMENTS

| | | | |
|---|---|---|---|
| 7,702,725 B2 | 4/2010 | Erickson et al. | |
| 7,734,678 B2 | 6/2010 | Herley | |
| 7,739,239 B1* | 6/2010 | Cormie | G06F 16/134 |
| | | | 707/637 |
| 7,752,214 B2 | 7/2010 | Pizzorni et al. | |
| 7,840,955 B1 | 11/2010 | Weathersby et al. | |
| 8,463,742 B1* | 6/2013 | Floyd | G06F 16/1748 |
| | | | 707/742 |
| 8,805,880 B2 | 8/2014 | Van Hensbergen | |
| 8,832,130 B2 | 9/2014 | Doddavula et al. | |
| 8,972,489 B2 | 3/2015 | Gregorio et al. | |
| 2002/0042833 A1* | 4/2002 | Hendler | H04L 65/612 |
| | | | 709/231 |
| 2004/0015579 A1* | 1/2004 | Cooper | H04L 47/10 |
| | | | 709/223 |
| 2004/0181576 A1* | 9/2004 | Lin | H04L 67/289 |
| | | | 709/219 |
| 2005/0125524 A1 | 6/2005 | Chandrasekhar et al. | |
| 2005/0193291 A1 | 9/2005 | Subramanian et al. | |
| 2007/0038697 A1* | 2/2007 | Zimran | G06F 16/166 |
| | | | 707/E17.01 |
| 2007/0061816 A1 | 3/2007 | Atkinson et al. | |
| 2008/0046616 A1* | 2/2008 | Verzunov | H04W 28/06 |
| | | | 710/68 |
| 2008/0052328 A1 | 2/2008 | Widhelm et al. | |
| 2010/0011091 A1 | 1/2010 | Carver et al. | |
| 2010/0250497 A1 | 9/2010 | Redlich et al. | |
| 2010/0333116 A1* | 12/2010 | Prahlad | G06F 3/0649 |
| | | | 713/153 |
| 2011/0153697 A1* | 6/2011 | Nickolov | H04L 67/1031 |
| | | | 707/827 |
| 2011/0289126 A1* | 11/2011 | Aikas | G06F 16/172 |
| | | | 707/827 |
| 2012/0084306 A1 | 4/2012 | Merritt | |
| 2012/0215779 A1 | 8/2012 | Lipstone | |
| 2012/0296866 A1 | 11/2012 | Doddavula et al. | |
| 2013/0024424 A1 | 1/2013 | Prahlad et al. | |
| 2013/0024700 A1 | 1/2013 | Peterson et al. | |
| 2013/0238572 A1 | 9/2013 | Prahlad et al. | |
| 2014/0040330 A1 | 2/2014 | Van Hensbergen | |
| 2014/0108665 A1 | 4/2014 | Arora et al. | |
| 2014/0181013 A1* | 6/2014 | Micucci | H04L 63/08 |
| | | | 707/610 |

OTHER PUBLICATIONS

Kuhn, Darl, et al., "Chapter 6: Archiving and Compressing Files", Linux and Solaris Recipes for Oracle DBAs, 2nd Edition, Apress, Berkeley, CA, Nov. 26, 2015, pp. 139-155.*

Granneman, Scott, "Archiving and Compression", Linux Journal, www.linux.journal.com/article/9370, Oct. 26, 2006, pp. 1-23.*

"tar", FreeBSD Manual Pages, May 15, 2008, downloaded from: man.freebsd.org/cgi/man.cgi?query=bsdtar&section=1&manpath=FreeBSD+6.4-RELEASE, pp. 1-9.*

Microsoft Computer Dictionary, 5th Edition, Microsoft Press, Redmond, WA, © 2002, pp. 30, 33, 141, 228, 336, 458, 489 and 502.*

"tar (computing)", Wikipedia, downloaded from: https://en.wikipedia.org/wiki/Tar_(computing) on Feb. 11, 2023, pp. 1-11.*

"Metadata", Wikipedia, downloaded from: https://en.wikipedia.org/wiki/Metadata on Feb. 11, 2023, pp. 1-27.*

McCarty, Bill, "Chap 4.3 How Linux Organizes Data", Learning Debian GNU/Linux, 1st Edition, Sep. 1999, downloaded from: https://www.oreilly.com/openbook/debian/book/ch04_03.html, pp. 1-15.*

Ghemawat, Sanjay, et al., "The Google Filesystem", SOSP '03, Bolton Landing, NY, Oct. 19-22, 2003, pp. 29-43.*

Batten, Christopher, et al., "pStore: A Secure Peer-to-Peer Backup System", MIT Laboratory for Computer Science, 2001, 12 pages.*

Anderson, O. T., et al., "Global namespace for files", IBM Systems Journal, vol. 43, Issue 4, 2004, pp. 702-772.*

Microsoft Computer Dictionary, 5th Edition, Microsoft Press, Redmond, WA, © 2002, pp. 12, 394 and 447.*

Langtangen, Hans Petter, Python Scripting for Computational Science, 3rd Edition, Springer-Verlag, Berlin, Germany, © 2008, pp. 366-367.*

Underwood, William, et al., "Study of the Presidential Electronic Records PilOt System (PERPOS): Final Report", PERPOS Technical Report ITTL/CISTD 02-4, Georgia Tech Research Institute, ARL Contract No. DAKF11-97-D-0001, Task Order 64, Dec. 2002, 23 pages.*

Rodriguez, Alex, "RESTful Web services: The basics", developerWorks, © IBM Corporation 2008, pp. 1-11.

Cholia, Shreyas, et al., "NEWT: A RESTful Service for Building High Performance Computing Web Applications", GCE 2010, New Orleans, LA, Nov. 14, 2010, 11 pages.

Haselmann, Till, et al., "Looking a REST-based API for Database-as-a-Service Systems", CEC 2010, Shanghai, China, Nov. 10-12, 2010, pp. 17-24.

Muller, Keith, "Open BSD manual page server—tar", University of California at San Diego, Jun. 11, 1996, pp. 1-3.

Nelson Michael L., "Open BSD manual page server—tar", University of California at San Diego, Jun. 11, 1996, pp. 1-3.

Moorthy, Sathiya, "The Ultimate Tar Command Tutorial with 10 Practical Examples", The Geek Stuff, www.thegeekstuff.com/2010/ <http://www.thegeekstuff.com/2010/> 04/unix-tar-command-examples/, Apr. 26, 2010, pp. 1-18.

"Tar Extract a Single File(s) From a Large Tarball", nixCraft, https://www.cyberciti.biz/faq/linux-unix-extracting-specific-files/, <http://www.cyberciti.biz/faq/linux-unix-extracting-specific-files/> Dec. 6, 2008, pp. 1-6.

Microsoft Computer Dictionary, 5th Edition, Microsoft Press, Redmond, WA, © 2002, p. 33.

JAR (file format), Wikipedia, downloaded from en.wikipedia.org/wiki/JAR_(file_format) on Dec. 9, 2015, pp. 1-6.

"Marshalling (computer science)", Wikipedia, downloaded from en.wikipedia.org/wiki/ Marshalling_(computer science) on Nov. 10, 2014, pp. 1-3.

"Representational state transfer", Wikipedia, downloaded from en.wikipedia.org/wiki/RESTful on Nov. 10, 2014, pp. 1-9.

"Serialization", Wikipedia, downloaded from en.wikipedia.org/wiki/ Serialization on Nov. 10, 2014, pp. 1-10.

"Zip (file format)", Wikipedia, downloaded from en.wikipedia.org/wiki/Zip_(file_format) on Dec. 9, 2015, pp. 1-10.

Aihkisalo, Tommi, et al., "A Performance Comparison of Web Service Object Marshalling and Umnarshalling Solutions", Services 2011, Washington, DC, Jul. 4-9, 2011, pp. 122-129.

Fielding, Roy T., et al., "Principled Design of the Modem Web Architecture", ACM Transactions on Internet Technology, vol. 2, No. 2, May 2002, pp. 115-150.

Gonzales-Barbone, Victor, et al., "Creating the first SCORM object", Computers & Education, vol. 51, Issue 4, Dec. 2008, pp. 1634-1647.

International Search Report and Written Opinion in International Application No. PCT/US2014/013824, mailed Apr. 7, 2014, 12 pages.

Johnson et al., "Eucalyptus Beginner's Guide—UEC Edition (Ubuntu Server 10.10—Maverick Meerkat) v2.0", Dec. 23, 2010 pp. 1-80, Retrieved from the Internet: URL:httni/cssoss.fiks.Ymrdnress comi20 HJil 2/eucabook.v2-0. ndf.

Kulkarni et al. 'Information Access in Mobile Computing Environments' Technical Report 93-11, Distributed Computing Research Lab, University of Notre Dame, Notre Dame, IN, Oct. 1993, 17 pages.

Mao, Huajian, et al., "Wukong: A cloud-oriented file service for mobile Internet devices", J. Parallel Distrib. Comput., vol. 72, Issue 2, Feb. 2012, pp. 171-184.

Microsoft Computer Dictionary, 5th Ed., Microsoft Press, Redmond, WA, © 2002, pp. 30, 33, 162, 213, 256.

Steinke, Tobias, The Universal Object Format—An Archiving Exchange Format for Digital Objects, ECDL 2006, LNCS 4172, Springer-Verlag, Berlin, Germany, (c) 2006, 3 pages.

Valente, Frederico, et al., "A RESTful Image Gateway for Multiple Medical Image Repositories", IEEE Transactions on Information Technology I Biomedicine, vol. 16, No. 3, May 2012, 9 pages.

(56) References Cited

OTHER PUBLICATIONS

Welch 'A Comparison of three Distributed File System Architectures: Vnode, Sprite, and Plan 9' Xerox PARC, Palo Alto, CA, 18 pages, Feb. 1, 2013.

* cited by examiner

ACCESSING OBJECTS IN HOSTED STORAGE

CROSS-REFERENCE TO REPLATED APPLICATION

This U.S. patent application is a continuation of, and claims priority under 35 U.S.C. § 120 from, U.S. patent application Ser. No. 16/020,956, filed on Jun. 27, 2018, which is a continuation of U.S. patent application Ser. No. 13/757,093, filed on Feb. 1, 2013. The disclosures of these prior applications are considered part of the disclosure of this application and are hereby incorporated by reference in their entireties.

TECHNICAL FIELD

This document relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a method for storing multiple files in a hosted storage system, the method includes receiving, at a hosted storage system, a storage request sent by a client system over a network to the hosted storage system. The storage request includes a single object and conforming to an API implemented by the hosted storage system for accessing storage services provided by the hosted storage system over the network. The API is designed to only support a single object in a storage request. The method further includes extracting, at the hosted storage system, the single object from the received storage request. The method further includes determining that the single object is an archive file composed of multiple bundled files. The method further includes, in response to determining that the single object is an archive file, extracting each of the bundled files from the archive file. The method further includes separately storing each of the extracted files in the hosted storage system such that each of the extracted files is separately accessible by the client system over the network.

Implementations can include any, all, or none of the following features. The archive file can include a metadata file with a defined name. The metadata file can include access control information for each of the multiple bundled files, the method further including extracting the metadata file from the archive; extracting the access control information for each of the multiple bundled files from the extracted metadata file; generating an access control list for each of the extracted files based on the extracted access control information; and storing each access control file in association with the corresponding extracted file. Each access control file can define access permissions for the corresponding extracted file. Each of the bundled files can have a filename designated in the archive file and the metadata file designates a common prefix, the method including extracting the common prefix from the extracted metadata file; and wherein separately storing the extracted files includes storing each of the extracted files with a name that includes the common prefix and the filename designated for the extracted file in the archive file.

The method can include receiving, at the hosted storage system, a retrieval request sent by the client system over the network to the hosted storage system, the retrieval request designating multiple objects and conforming to a API implemented by the hosted storage system for accessing storage services provided by the hosted storage system over the network, wherein the API is designed to only support a single object in a response to the retrieval request; in response to receiving the retrieval request, accessing the multiple objects designated in the retrieval request; generating a single response object based on the accessed objects, wherein the response object is an archive file that includes the accessed objects; generating a response to the retrieval request, the response including the response object; and sending the response to the retrieval request to the client system over the network.

The method can include receiving, at the hosted storage system, a retrieval request sent by the client system over the network to the hosted storage system, the retrieval request designating a common prefix and conforming to a API implemented by the hosted storage system for accessing storage services provided by the hosted storage system over the network, wherein the API is designed to only support a single object in a response to the retrieval request; in response to receiving the retrieval request, identifying one or more objects that include the common prefix in the name of the object; accessing the identified objects; generating a single response object based on the accessed objects, wherein the response object is an archive file that includes the accessed objects; generating a response to the retrieval request, the response including the response object; and sending the response to the retrieval request to the client system over the network. The prefix may be a directory path in the hosted storage system. The API may be a RESTful API. The archive file may be a compressed archive.

In one aspect, a system for storing multiple files in a hosted storage system includes a hosted storage system configured to receive a storage request sent by a client system over a network to the hosted storage system. The storage request includes a single object and conforming to a API implemented by the hosted storage system for accessing storage services provided by the hosted storage system over the network. The API is designed to only support a single object in a storage request. The system further includes extract the single object from the received storage request. The hosted storage system is further configured to determine that the single object is an archive file composed of multiple bundled files. The hosted storage system is further configured to, in response to determining that the single object is an archive file, extract each of the bundled files from the archive file. The hosted storage system is further configured to separately store each of the extracted files in the hosted storage system such that each of the extracted files is separately accessible by the client system over the network. The system further includes the client system configured to send, to the hosted storage system over a network, the storage request.

Implementations can include any, all, or none of the following features. The archive file may include a metadata file with a defined name. The metadata file may include access control information for each of the multiple bundled files, the hosted storage system further configured to extract the metadata file from the archive; extract the access control information for each of the multiple bundled files from the extracted metadata file; generate an access control list for each of the extracted files based on the extracted access control information, the access control lists defining access permissions for the corresponding extracted file; and store each access control file in association with the corresponding extracted file. Each access control file may define access permissions for the corresponding extracted file. Each of the bundled files may have a filename designated in the archive file and the metadata file designates a common prefix, the hosted storage system further configured to extract the metadata file from the archive; extract the common prefix from the extracted metadata file; and wherein separately storing the extracted files includes storing each of the extracted files with a name that includes the common prefix and the filename designated for the extracted file in the archive file.

The hosted storage system may be further configured to receive a retrieval request sent by the client system over the network to the hosted storage system, the retrieval request designating multiple objects and conforming to a API implemented by the hosted storage system for accessing storage services provided by the hosted storage system over the network, wherein the API is designed to only support a single object in a response to the retrieval request; in response to receiving the retrieval request, access the multiple objects designated in the retrieval request; generate a single response object based on the accessed objects, wherein the response object is an archive file that includes the accessed objects; generate a response to the retrieval request, the response including the response object; and send the response to the retrieval request to the client system over the network; and the client system may be further configured to send, to the hosted storage system, the retrieval request; and receive, from the hosted storage system, the response to the retrieval request.

The hosted storage system may be further configured to receive a retrieval request sent by the client system over the network to the hosted storage system, the retrieval request designating a common prefix and conforming to a API implemented by the hosted storage system for accessing storage services provided by the hosted storage system over the network, wherein the API is designed to only support a single object in a response to the retrieval request; in response to receiving the retrieval request, identify one or more objects that include the common prefix in the name of the object; access the identified objects; generate a single response object based on the accessed objects, wherein the response object is an archive file that includes the accessed objects; generate a response to the retrieval request, the response including the response object; and send the response to the retrieval request to the client system over the network; and the client system may be further configured to send, to the hosted storage system, the retrieval request; and receive, from the hosted storage system, the response to the retrieval request. The prefix is a directory path in the hosted storage system. The API is a RESTful API. The archive file is a compressed archive.

In one aspect, a computer-readable storage medium storing instructions that, when executed by one or more processing devices, cause the processing device to perform operations includes receiving, at a hosted storage system, a storage request sent by a client system over a network to the hosted storage system. The storage request includes a single object and conforming to an API implemented by the hosted storage system for accessing storage services provided by the hosted storage system over the network. The API is designed to only support a single object in a storage request.

The operations further include extracting, at the hosted storage system, the single object from the received storage request. The operations further include determining that the single object is an archive file composed of multiple bundled files. The operations further include, in response to determining that the single object is an archive file, extracting each of the bundled files from the archive file. The operations further include separately storing each of the extracted files in the hosted storage system such that each of the extracted files is separately accessible by the client system over the network In one aspect, a system includes a source hosted storage system configured to store a plurality of files on behalf of a user and send, over a network to a client system, the plurality of files to a client system. The system further includes a client system, authorized by the user, configured to receive, from the source hosted storage system, the plurality of files. The client system if further configured to generate a storage request that includes a single object that is an archive object containing the plurality of files, the storage request conforming to a API implemented by a destination hosted storage system for accessing storage services provided by the destination hosted storage system over the network. The API is designed to only support a single object in a storage request. The client system if further configured to send, over a network to the destination hosted storage system, the storage request. The system further includes the destination hosted storage system configured to receive, from the client system, the storage request. The destination hosted storage system is further configured to extract the single object from the received storage request. The destination hosted storage system is further configured to determine that the single object is an archive file composed of multiple bundled files. The destination hosted storage system is further configured to, in response to determining that the single object is an archive file, extract each of the bundled files from the archive file. The destination hosted storage system is further configured to separately store each of the extracted files in the destination hosted storage system such that each of the extracted files is separately accessible by the client system over the network.

Implementations can include any, all, or none of the following features. The second API may be designed to only support a single object in a response to the retrieval request. To send, over the network to a client system, the plurality of files, the source hosed storage system can be configured to receive the retrieval request; in response to receiving the retrieval request, access the plurality of files; generate a single response object based on the plurality of files, wherein the response object is an archive file that includes the plurality of files; generate a response to the retrieval request, the response including the response object; and send the response to the retrieval request to the client system over the network. The second API is the API. To generate a single response object based on the plurality of file, the source hosted storage system may be configured to include the plurality of files in the response object; and include metadata associated with the plurality of files; and to separately store each of the extracted files in the destination hosted storage system such that each of the extracted files is separately accessible by the client system over the network, the destination hosted storage system is configured to: store the metadata in association with the extracted files. The client system can be a component of the destination hosted storage system. The source hosted storage system and the destination hosted storage system may be under different administrative control.

Implementations may include one or more of the following advantages. By bundling multiple objects for transport, a hosted storage system and a client system can effectively send and receive multiple data objects through application program interfaces (APIs) that are only designed to support a single object in a message. By bundling many data objects that are small compared to the size of the message headers, overall network use can be greatly reduced when passing many small data objects. The multiple data objects in a single message can be organized with common prefixes, supporting batch operations and flexibility in identifying directory locations.

The details of one or more implementations are set forth in the accompanying drawings and the description below. Other features and advantages will be apparent from the description and drawings, and from the claims.

DETAILED DESCRIPTION

A hosted storage system that only permits one data object per storage or access message can bundle or extract many objects in an archive object. These archive objects, as single objects, can carry multiple data objects between the hosted storage system and the client while still conforming to standards that specify only one data object per message. The multiple data objects per archive object can be organized with common prefixes, permitting batch storage and batch access.

Figure 1:
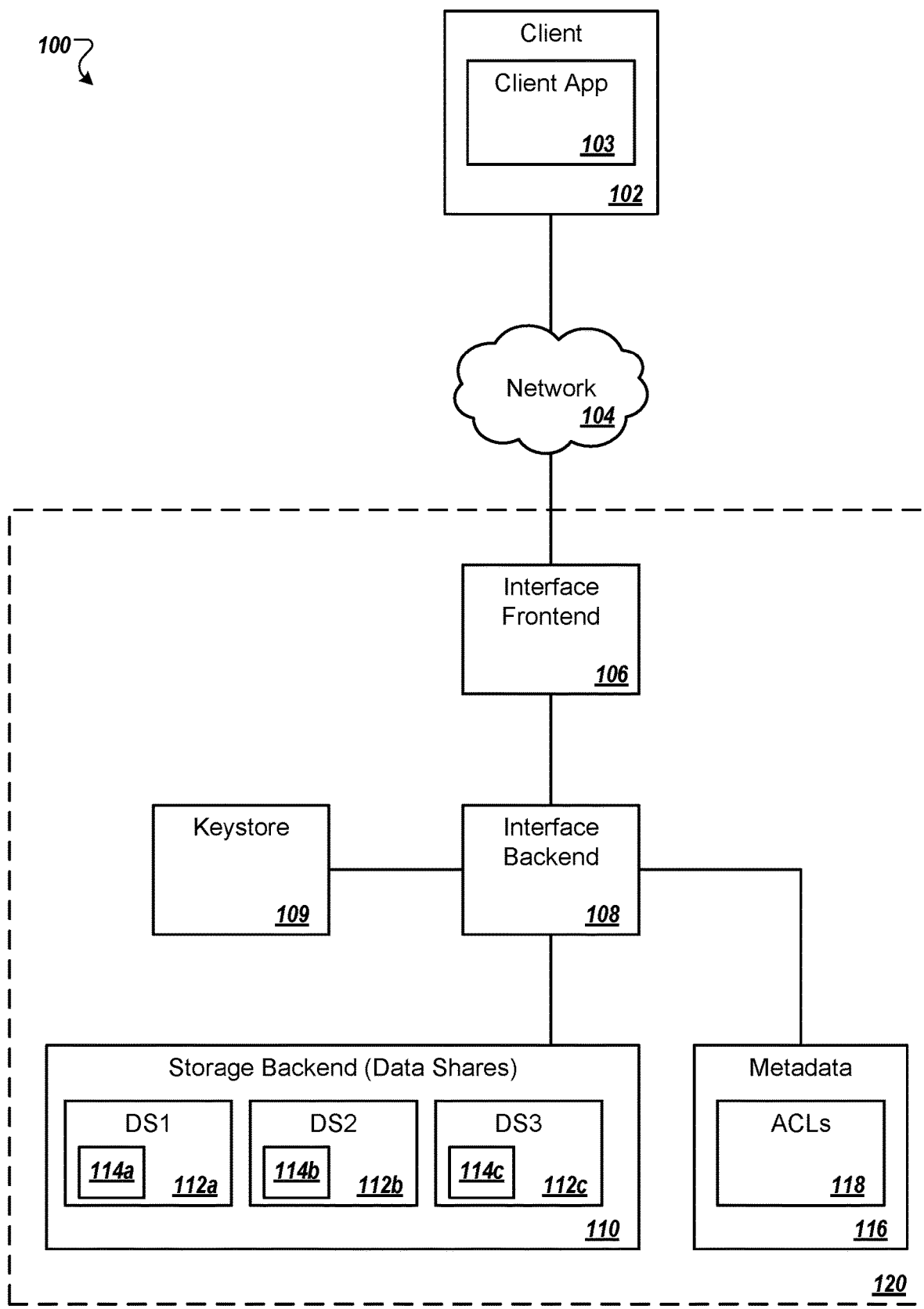
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device 102. In some implementations, a hosted storage services 120 can provide access to stored data by applications running on computing devices geographically separate from each other, provide offsite data backup and restore functionality, provide data storage to a computing device with limited storage capabilities, and/or provide storage functionality not implemented on a computing device.

The system 100 can provide scalable stores for storing data objects. The client device 102 can upload data objects to the hosted storage service 120 and control access to the uploaded data objects. Access control can include a range of security levels, from keeping data securely confidential to publishing it without restrictions. Data stored in hosted storage service 120 can be secured from unauthorized access. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for personal reasons (e.g. to store personal data in a secure online location, to provide access to data from multiple devices, and to retain access to data while away from a primary device or system), mutual business reasons (e.g., submission of work product ordered by the owner of the hosted storage service 120), or for use in data processing by other services (e.g., images uploaded are used to automatically and dynamically create a photo gallery web page.)

Figure 8:
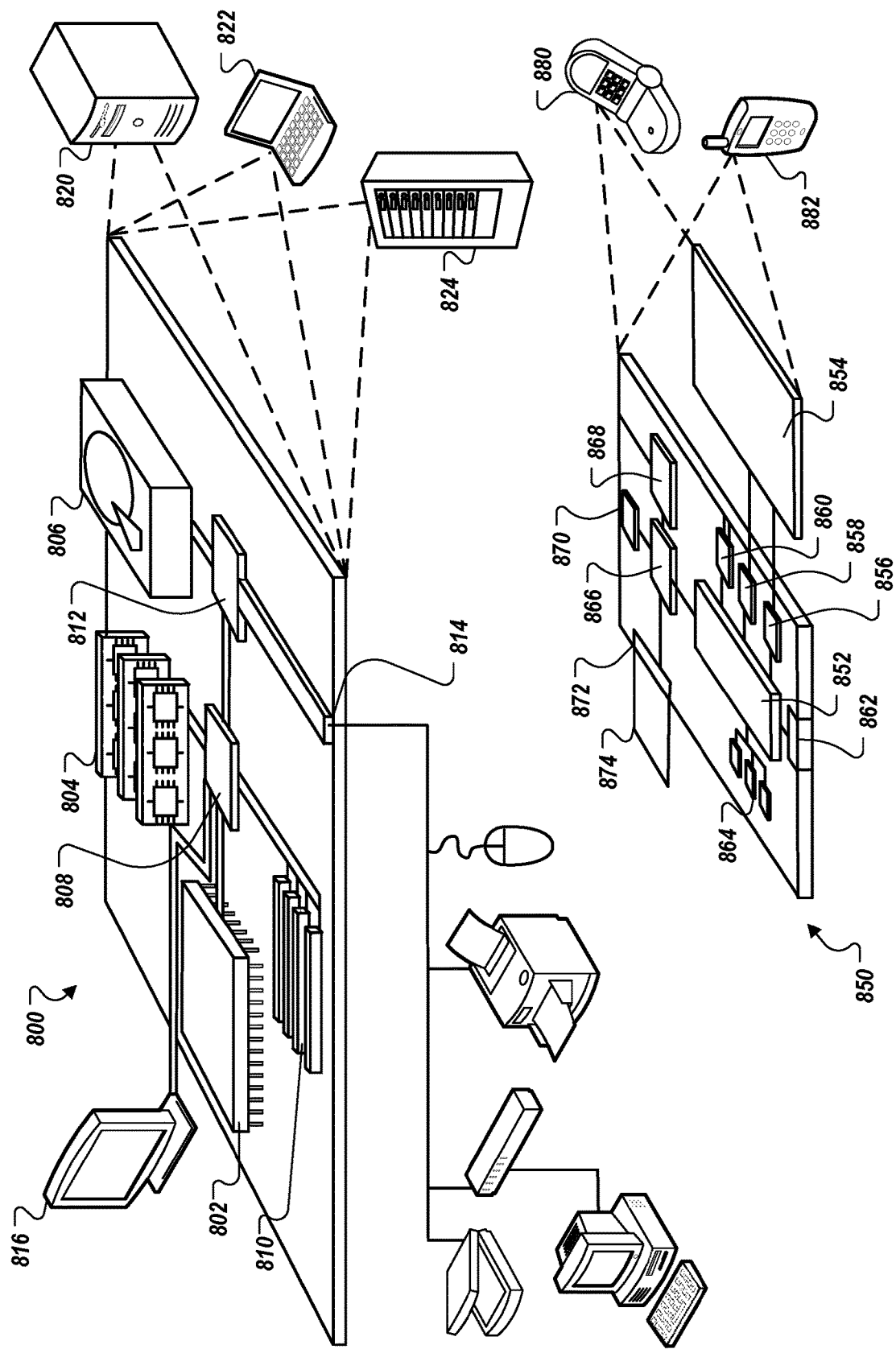
FIG. 8 shows an example of a computing device and a mobile computing device.

The client device 102 can be implemented using a computing device, such as the computing device 800 or the mobile device 850 described with respect to FIG. 8. The client device 102 can communicate with the hosted storage service 120 via a network 104, such as the Internet. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data objects in the hosted storage service 120. The hosted storage service 120 can be implemented by one or more server devices, which can be implemented using a computing device, such as the computing device 800 or mobile device 850 described with respect to FIG. 8. For example, the hosted storage service 120 can be implemented by multiple server devices operating in the same, or different, data centers.

The hosted storage service 120 generally includes an interface frontend 106, an interface backend 108, a storage backend 110, metadata 116 for objects stored in the storage backend 110, and a keystore 109. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. In some implementations, the Web Service APIs and/or the configuration of the hosted storage service 120 may place constraints on the types or contents of messages that pass through the APIs. One example of such a constraint is that messages sent and received by the hosted storage service 120 may only contain one data object. Other examples include, but are not limited to, message headers that must be present in a message, maximum file size of data objects, and responses that must be made in reply to a received message.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 120. The PUT and POST verbs may be used to upload an object to the service 120. PUT requests can come from the client 102 and contain authentication and authorization credentials and object metadata in the message, such as in an HTTP header. POST requests can be received when a client 102 wants to upload from a web browser form. The form POST upload protocol for the hosted storage service 120 can involve multiple required form fields to provide authentication, authorization and object metadata. More generally, any of the API requests may include processing instructions (including pre- or post-processing instructions, metadata, and/or credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 120 (e.g., if the organization operating the hosted storage service 120 also operates other web services such as email service.) A user can also or alternatively be authenticated based on authentication credentials from an external credentialing service or an external service that includes credentialing functionally. User or group identifier information can be calculated from the external service's credential information. Requests sent by the client 102 to the interface frontend 106 can be translated and forwarded to the external service for authentication.

In general, objects stored in the hosted storage service 120 can be referenced by object identifiers. The hosted storage service 120 can define name schemes to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers.

Objects can be stored in hosted storage service 120 in buckets. In some examples, each bucket is uniquely named in the hosted storage service 120, each object is uniquely named in a bucket, and every bucket and object combination is unique. Objects may be uniquely identified by a URI that includes the bucket name and the object name, and identifies the hosted storage service 120. For example, an object named "long/song.mp3" in a bucket named "music" could be specified using a URI pattern such as http://s.[anyexampledomain].com/music/long/song.mp3 or http://music.s.[anyexampledomain].com/long/song.mp3. Alternatively, the user of the client 102 can create a bucket named www.[secondexampledomain], publish a CNAME alias redirecting that to http://music.s.[anyexampledomain].com, and address the object as http://www.[secondexampledomain]/long/song.mp3. In some examples, buckets do not nest.

The interface backend 108 can handle request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted.) The interface backend can also provide encryption and decryption services to prevent unauthorized access to data, even by internal users.

A keystore 109 can store encryption keys for data objects, where the encryption keys have themselves been encrypted by the interface backend 108. The encrypted keys can carry associated metadata that is cryptographically bound to the key itself, and are referred here to as wrapped keys. From the point of view of the interface backend 108, the wrapped keys can be opaque objects. To obtain the cleartext key of a wrapped key for use (e.g., to encrypt or decrypt a data object) the interface backend 108 can provide the wrapped key and client authentication credentials to the keystore 109. The keystore 109 can verify, based in part on the wrapped key's metadata, that the provided authentication credential is sufficient to authorize release of the key, and if so, can return the unwrapped key to the interface backend 108. The interface backend 108 can use the key to encrypt or decrypt the data object and then can discard the key.

In some examples, the encryption key is a symmetric key that can be used to both encrypt and decrypt an object. In some examples, a wrapped key can have associated metadata indicating multiple users or groups authorized to access the cleartext key. In some examples, the keystore 109 can copy a wrapped key and rewrap the key for a different principle (e.g., containing different metadata).

The interface backend 108 can manage metadata 116 associated with data objects, for example in a structured data format such as a database (e.g., MySQL). User-specified names labeling the buckets can be completely defined within the metadata 116, and object metadata 116 can map a resource name to one or more data shares 112 storing the resource. The metadata 116 can also contain bucket and object creation times, object sizes, hashes, and access control lists 118 (ACL 118) for both buckets and objects. The interface backend 108 can log activity and track storage consumption to support accounting for billing and chargebacks. In some examples, this include quota monitoring in each dimension in which customers are charged (e.g., reads, writes, network transfers, total storage in use.)

The ACLs 118 define who is authorized to perform actions on corresponding buckets or objects, and the nature of the permitted actions. The ACLs 118 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Object Roles below shows a list of example roles that can be included in ACLs 118 for data objects.

TABLE 1

Bucket Roles

| Role | Capabilities |
|---|---|
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
|---|---|
| READ | Can read the object. |
| FULL_CONTROL | READ capabilities plus ability to read and write the object ACL. |

Scopes can be defined to a single user or a group of users. In one implementation, those users with a FULL_CONTROL role (and therefore able to modify the ACL for a given bucket or resource) may define a group of users, and then provide a role for the group. For example, a group of users may be managed by the hosted storage service 120 (or, more generally, by the service provider that provides the hosted storage service 120) for reasons other than storage permissions (for example, for a message board or other service that employs groups) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group.

Table 3: Scopes below shows a list of example scopes that can be included in ACLs 118 for buckets and/or data objects.

TABLE 3

Scopes

| Name | Description |
|---|---|
| Service ID | A single authenticated user specified by username. |
| Email Address | A single user specified by an email address. |
| Service Group ID | A group of users managed by the hosted storage service 120 and specified by an associated identifier. |
| Invite Token | One or more users with access to a one time use digital token. |
| Group-Restricted Key | One or more users with access to a permanent use digital key. |
| All Service Users | All authenticated users of the hosted storage service 120. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 118 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 118. In some examples, it is possible to create an object that the bucket owner cannot read.

The storage backend 110 can contain multiple datastores 112a-112c. Although three datastores 112 are shown, more or fewer are possible. Each of the datastores 112a-112c can store data objects 114a-114c in a particular format. For example, data store 112a can store a data object 114a as a Binary Large Object (BLOB), data store 112b can store a data object 114b in a distributed file system (e.g., Network File System), and data store 112c can store a data object 114c in a structured data format such as a database (e.g., MySQL.)

Figure 2:
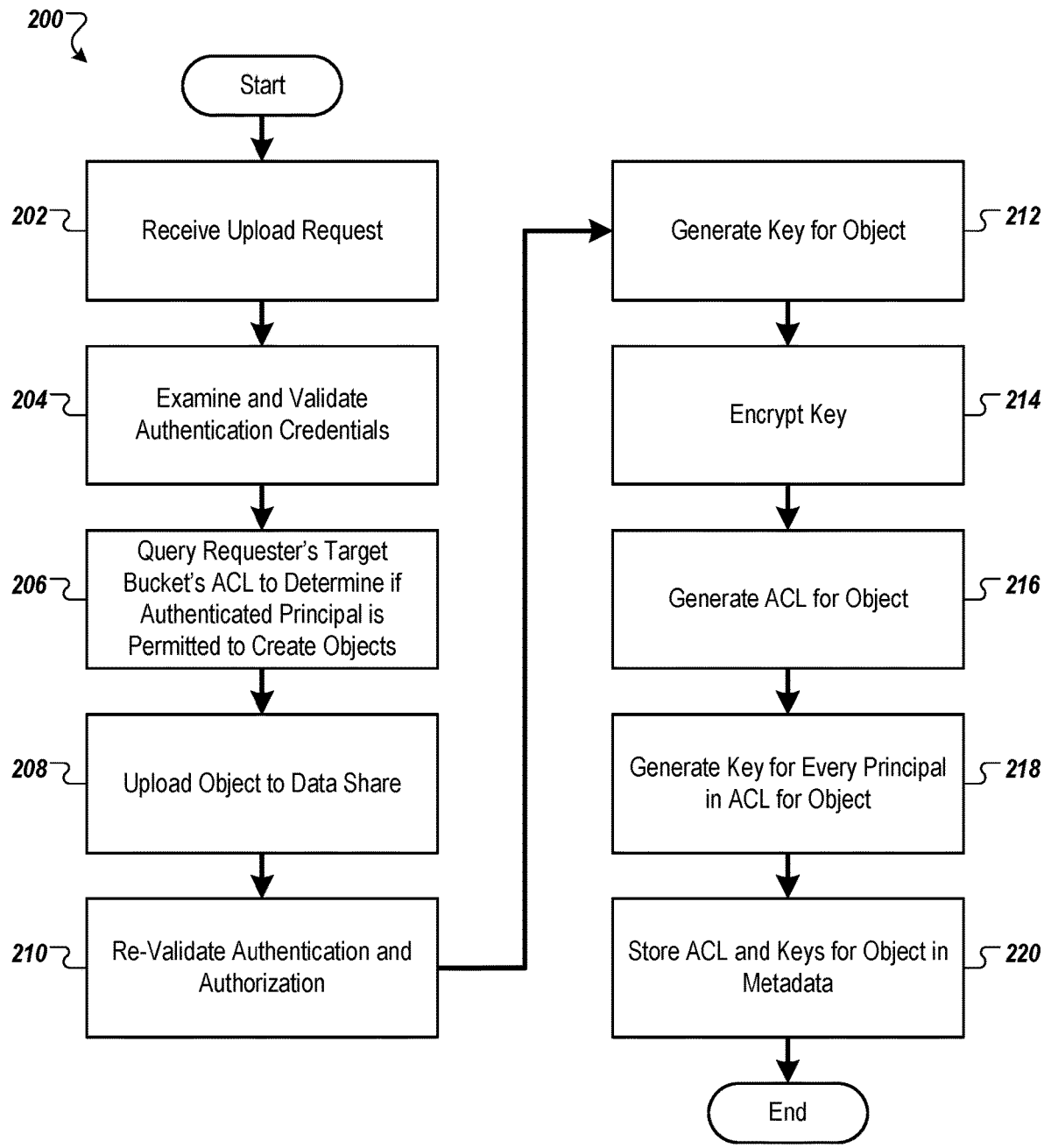
FIG. 2 is a flow chart showing an example of a process for storing a single data object in a hosted storage service.

FIG. 2 is a flow chart showing an example of a process 200 for storing a single data object in a hosted storage service. The process 200 can be performed by, for example, the interface frontend 106 and the interface backend 110, and for clarity of presentation, the description that follows uses the system 100 as the basis for describing the process. However, another system, or combination of systems, may be used to perform the process 200.

A request is received by the interface frontend 106 from the client application 103 to store an object (202). The request can include a HTTP PUT or POST request, an authentication credential that authenticates the principal (entity) making the request, a data object, and a target for the object consisting of a bucket and data object name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage service 120. External credentials (e.g., user names and passwords for another system) can be sent to the associated external system for validation.

The interface backend 108 can query the request's target bucket's ACL 118 to determine if the authenticated principal is permitted to create an object in the bucket (206). For example, the principal or a group the principal is a member of can have the WRITE or FULL_CONTROL role assigned in the bucket's ACL 118, which would allow the principal to create an object in the bucket. If the principal is not authorized to create an object, the request is denied.

Otherwise, the interface backend 108 uploads the object to the target bucket with the target data object name to a datastore 112 (208). In some examples, each bucket is associated with only a single datastore 112, and specifying a target bucket specifies a datastore 112. In some examples, the interface backend 108 can examine the data object or use a parameter in the RPC from the interface frontend 106 to determine which datastore 112 to store the object in, with associated metadata 116 indicating the location of the object (that is, the particular datastore the object is stored in and the object's location in that datastore).

The interface backend 108 re-validates the principal's authentication and authorization (210). To support long-running uploads, expiry times of authentication credentials can be temporarily ignored.

The interface backend 108 generates a new document key request to the keystore 109 for a wrapped key for the newly-uploaded object (212). The new wrapped key is tied to the authentication credentials of the principal of the request. The keystore 109 can also supply an encryption key to encrypt the wrapped key. The interface backend 108 encrypts the wrapped key (214).

The interface backend 108 creates an ACL 118 representing the access control list for the newly created object (216). In some example, a default ACL 118 is used or an ACL 118 can be specified by the request from the client 102.

The interface backend 108 generates a new document key request to the keystore 109 for a wrapped key for every principal (user or group) in the ACL 118 with permissions to read the object or modify the object's ACL 118. Each new wrapped key is tied to a single principal. The keystore 109 can also supply an encryption key to encrypt the wrapped keys, or the interface backend 108 can reuse the encryption key from the step 108.

The interface backend 108 stores the object's ACL 118 and wrapped keys in the object's metadata 116. The encryption key or keys can be discarded by the interface backend 108.

Figure 3:
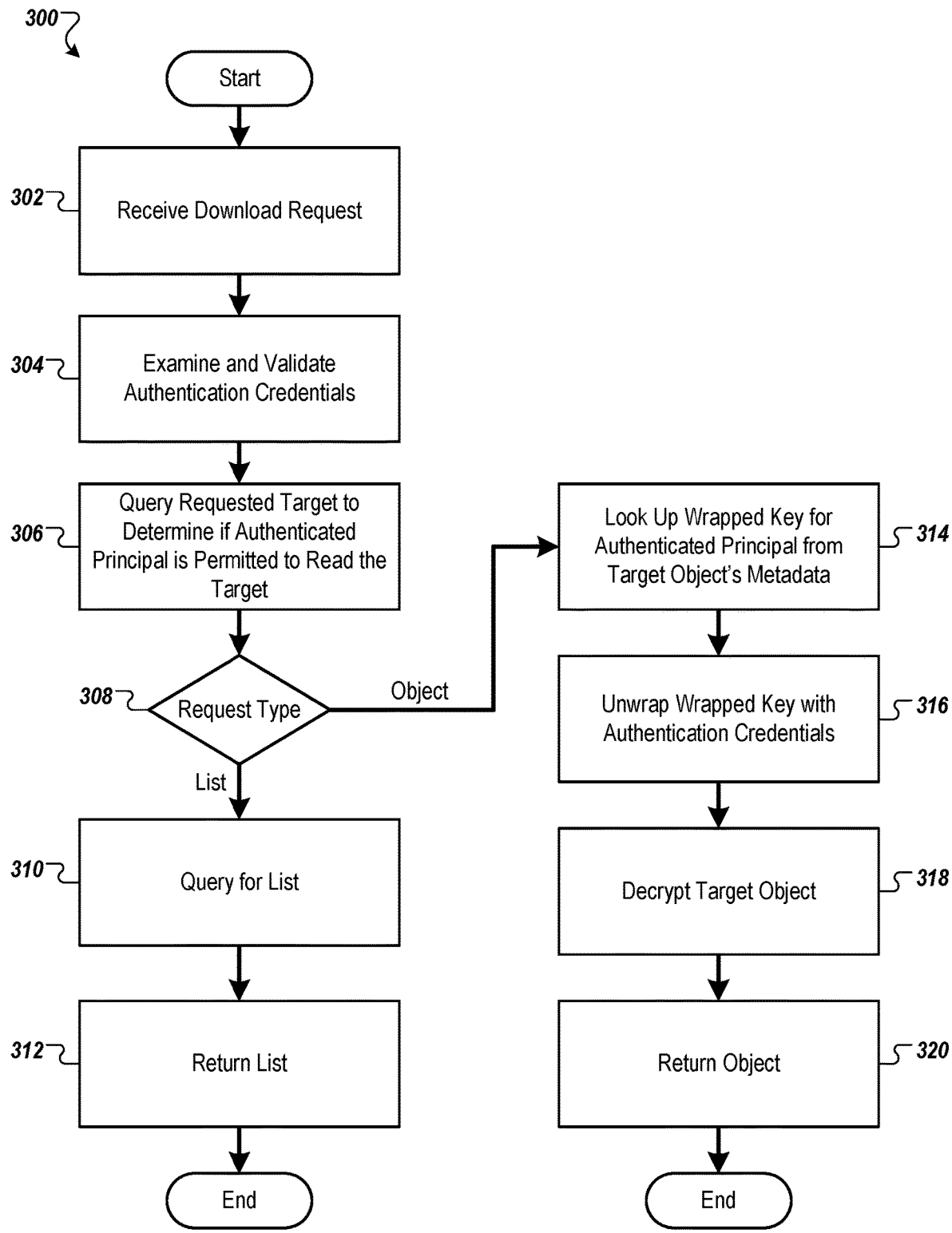
FIG. 3 is a flow chart showing an example of a process for providing a single data object in a hosted storage service.

FIG. 3 is a flow chart showing an example of a process 300 for providing a single data object in a hosted storage service. The process 300 can be performed by, for example, the interface frontend 106 and the interface backend 110, and for clarity of presentation, the description that follows uses the system 100 as the basis for describing the process. However, another system, or combination of systems, may be used to perform the process 300.

A request is received by the interface frontend 106 from the client application 103 to download an object (302). The request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage service 120. External credentials (e.g., user names and passwords for another system) can be sent to the associated external system for validation.

The interface backend 108 queries the request's bucket or object ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the object, the request is denied.

Otherwise, the interface backend 108 determines if the request is for a bucket or for an object (308). If the request is for a bucket, the interface backend 108 queries for a list of the bucket's contents (310) and the listing is returned to the client application 103 (312).

If the request is for an object, the interface backend 108 looks up the appropriate wrapped key for the given authenticated requestor from the object's metadata 116 (314). The interface backend 108 sends the wrapped key and the authentication credentials to the keystore 109, which can return the decrypted object encryption key to the interface backend 108 (316). The interface backend 108 can fetch and decrypt the target object (318) to be returned to the client application 103 (320).

Figure 4:
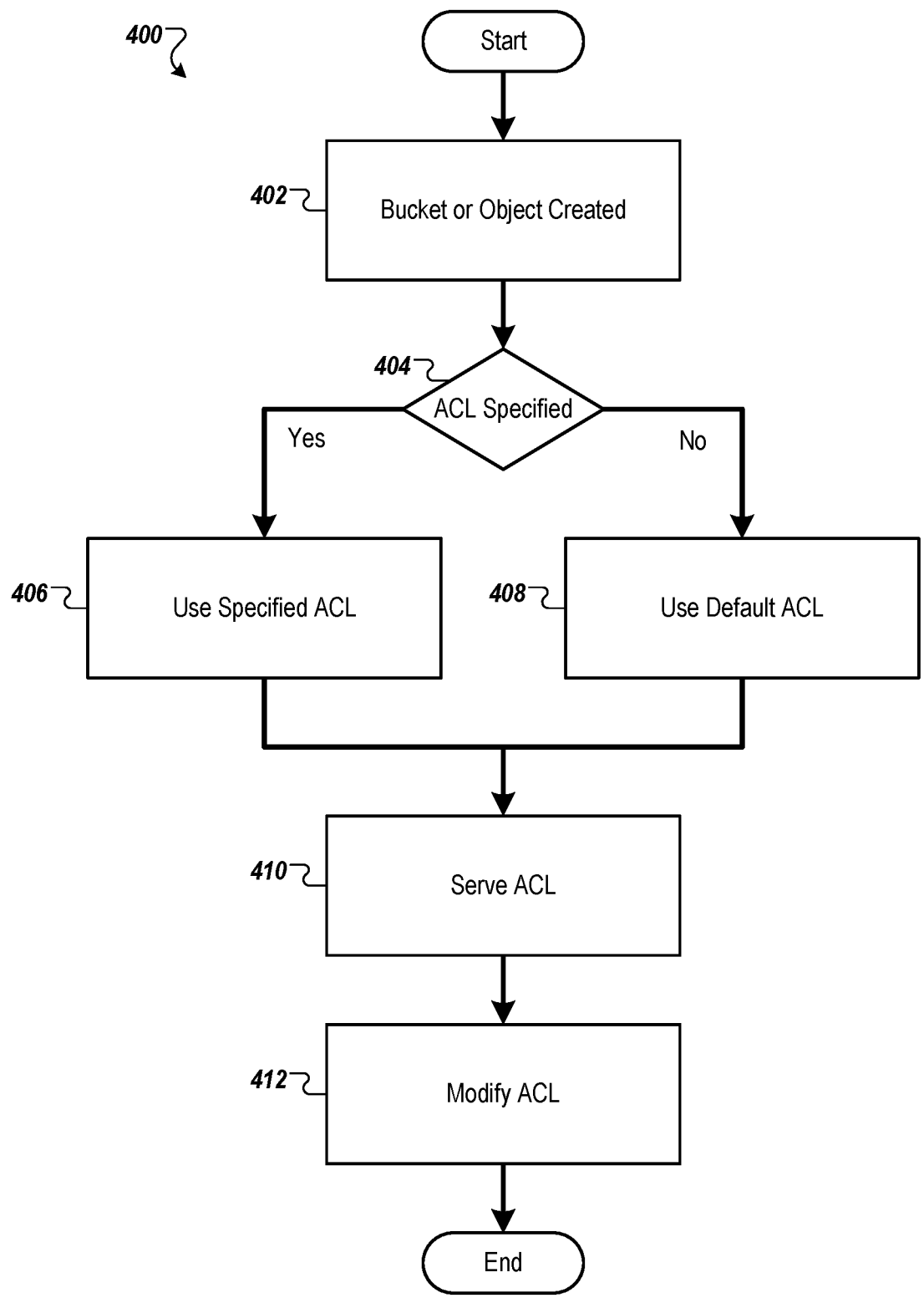
FIG. 4 is a flow chart showing an example lifecycle of an access control list.

FIG. 4 is a flow chart showing an example lifecycle 400 of an ACL 118. Although the steps of the lifecycle 400 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or object is created by the backend interface 108 based on requests from the client application 103 (402). The client request can include a bucket name, an object name, and/or an ACL 118. The principal requesting the new bucket or object is authenticated and made the owner of the bucket or object.

If an ACL 118 is specified in the request (404), the specified ACL 118 is associated with the bucket or object. If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" ACL. A list of pre-specified or 'canned' ACLs 118 is shown in Table 4 Canned ACLs below. The canned ACLs 118 can be cataloged by the hosted storage system 120 and referenced by the client application 103 by name, rather than requiring the request enumerate each scope and role pair.

TABLE 4

Canned ACLs

| Canned ACL Name | {scope, permission} |
|---|---|
| private | {creating user or bucket owner, FULL_CONTROL} |
| public-read | {all users, READ} |
| | {bucket owner, FULL_CONTROL} |

TABLE 4-continued

Canned ACLs

| Canned ACL Name | {scope, permission} |
|---|---|
| public-read-write | {all users, WRITE} |
| | {bucket owner, FULL_CONTROL} |
| authenticated-read | {all authenticated users, READ} |
| | {bucket owner, FULL_CONTROL} |
| bucket-owner-read [for objects only] | {bucket owner, READ} |
| | {object owner, FULL CONTROL} |
| bucket-owner-full-control [for objects only] | {bucket owner, FULL_CONTROL} |
| | {object owner, FULL_CONTROL} |

If an ACL 118 is not specified in the request (404), a default ACL 118 can be used (408). For example, bucket and object creation can default to the "private" canned ACL 118 for authenticated users. For object creation by unauthenticated users, such as for new objects created in a "public-read-write" bucket, a default of "bucket-owner-full-control" can be used.

An ACL 118 can be served, for example, to a principal with READ, WRITE, or FULL_CONTROL of the associated bucket or object (410). For example, a client application 103 can perform a HTTP GET to a target's URI with the query string ?acl to retrieve the ACL associated with the target. The ACL 118 can be serialized and returned to the client application 103.

The serialization may be defined, for example, by the following extended Backus-Naur form. Nonterminals appear in sans serif italics, terminals appear in courier Bold, { } denote zero or more repetitions, [ ] enclose optional entities, | separates alternatives, and ( ) denote grouping. The terminal symbols canonical-id, email-address, and domain are defined in English below:

access-control-list: <AccessControlList> owner entries</AccessControlList>
    owner: <Owner> id</Owner>
    entries: <Entries> entry {entry}</Entries>
    entry: <Entry> (permission scope|scope permission)</Entry>
    permission:<Permission>(READ WRITE|FULL_CONTROL)</Permission>
    scope: <Scope type=UserById> id</Scope>
    |<Scope type=UserByEmail> email</Scope>
    <Scope type=GroupById> id</Scope>
    |<Scope type=GroupByEmail> email</Scope>
    <Scope type=GroupByDomain><Domain> domain</Domain></Scope>
    |<Scope type=AllUsers/>
    |<Scope type=AllAuthenticatedUsers/>
    id: <ID> canonical-id</ID>[<Name> text</Name>]
    |[<Name> text</Name>]<ID> canonical-id</ID>
    email: <EmailAddress> email-address</EmailAddress> [<Name> text</Name>]
    |[<Name> text</Name>]<EmailAddress> canonical-id</EmailAddress>
    text: {printable character excluding<and>}
    canonical-id: 64 hex digits
    email-address: standard RFC 822 email address
    domain: standard RFC 822 domain specification A canonical-id or an email-address can identify a user or a group. A canonical-id is the encrypted service id for the user or group. Email addresses are a convenience for specifying canonical ids. In some implementations, the ACLs returned from the system always contain canonical ids. The <Name> text</Name> element may be used for information purposes only such that it is otherwise ignored by the system, and the system does not return it if there is no public name associated with the user or group.

An example serialized ACL 118 is shown below.

<AccessControlList>
    <Owner>
    <ID>a9a7b886d6fd24a52fe8ca5bef65f89a64e0193f230-00e241bf9b1c61be666e9</ID>
    <Name>chriscustomer</Name>
    </Owner>
    <Entries>
    <Entry><Permission>FULL_CONTROL</Permission>
    <Scope type=UserById>
    <ID>a9a7b886d6fd24a52fe8ca5bef65f89a64e0193f230-00e241bf9b1c61be666e9</ID>
    <Name>chriscustomer</Name>
    </Scope>
    </Entry>
    <Entry><Permission>FULL_CONTROL</Permission>
    <Scope type=UserById>
    <ID>79a59df900b949e55d96a1e698fbacedfd6e09d98-eacf8f8d5218e7cd47ef2be</ID>
    <Name>Frank</Name>
    </Scope>
    </Entry>
    <Entry><Permission>FULL_CONTROL</Permission>
    <Scope type=UserById>
    <ID>de019164ebb0724ff67188e243eae9ccbebdde5237-17cc312255d9a82498e394a</ID>
    <Name>Jose</Name>
    </Scope>
    </Entry>
    <Entry><Permission>READ</Permission><Scope type=AllUsers></Entry>
    </Entries>
    </AccessControlList>

An ACL 118 can be updated, for example by a principal with FULL_CONTROL of the associated bucket or object (412). In some examples, a client must read, modify, and write an ACL 118 in order to update an ACL 118. In this example, the ACL 118 is served (410) as part of modification (412). In some implementations, a client application 103 can send ACL update requests to the hosted storage system 120.

Figure 5:
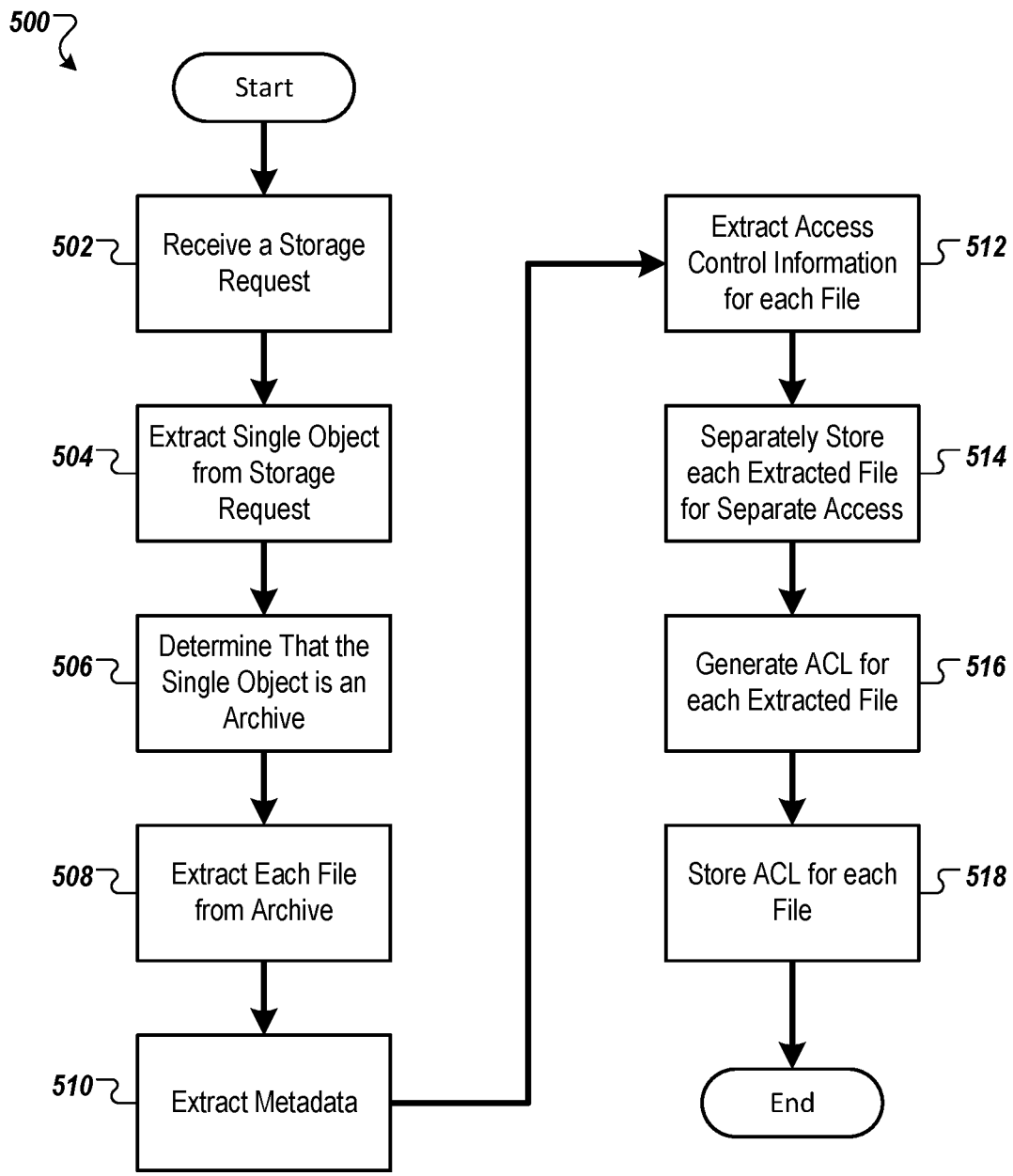
FIG. 5 is a flow chart showing an example of a process for storing multiple data objects from one request in a hosted storage system.

FIG. 5 is a flow chart showing an example of a process 500 for storing multiple objects from one request in a hosted storage system. The process can be performed by, for example, the interface frontend 106 and the interface backend 108, and for clarity of presentation, the description that follows uses the system 100 as the basis for describing the process. However, another system, or combination of systems, may be used to perform the process 500.

A storage request sent by a client system over a network is received by a hosted storage system (502). The storage request includes a single object and conforms to an API implemented by the hosted storage system for accessing storage services provided by the hosted storage system over the network. The API is designed to only support a single object in a storage request. For example, the hosted storage system 120 may receive the storage request from the client 102 through an API implemented by the hosted storage system 120. The message, as the API may specify, may contain no more than one object. The message may also include additional information. For example, a header flag may be set to indicate that the single object is an archive object.

The single object is extracted from the received storage request at the hosted storage system (504). For example, the interface frontend 106 may parse the message to identify the component elements of the message. The elements may include, but are not limited to, information about the client 102 (e.g. IP address, user identifier) and information about the single object in the message (e.g. file format, size, header flag indicating an archive object), and information about the message itself (e.g. HTTP command, time received). The interface frontend 106 can pass this information, along with the single object from the message, to the interface backend 108.

The single object is determined to be an archive file composed of multiple bundled files (506). For example, interface backend 108 can receive the information from the interface frontend 106. From this information, the interface backend 108 can determine if the single object is an archive file or, for example, a data object to be stored as described in the process 200 with respect to FIG. 2. In some implementations, the information from the interface frontend 106 may directly identify the single object as an archive object. For example, a flag in the received message may indicate that the message contains an archive file. Additionally or alternatively, the interface backend 108 may apply one or more tests to the information to determine if the single object is an archive object. For example, if the single object contains a file extension of a common archive format (e.g. .tar, .rar), the interface backend 108 can determine that the single object is an archive object based on the file extension.

An archive file is a file that is treated by a computer system as a single file, but which actually includes multiple files and has a well-defined way of distinguishing the files and their formats. For example, an archive file can also include metadata as part of the file that defines, for example, how to separate the individual files, the formats of the files, a file directory structure, error detection and recovery information, and file comments. There are several well-known archive formats, such as .tar and .LBR. Additionally, archive files can be formed from certain standards, such as the Multipurpose Internet Mail Extensions (MIME) standards.

The archive file may be a compressed archive file. Some archive formats support or require data compression in addition to archiving. This compression is usually, but not always, lossless compression that reduces data size by identifying and replacing statistical redundancies within the data. Some examples of archive formats with compression include, but are not limited to, .tar.gz, .gzip, and .rar. Alternatively, the archive file may be an uncompressed archive file in which the files are bundled without performing compression. Some archive formats do not support compression, or the compression may be optional. Some examples of archive formats without compression include, but are not limited to, .tar and .LBR. It will be understood that an uncompressed archive file may be compressed later in a different operation. For example, some transport-layer protocols compress all traffic. Additionally, a .tar archive may be later compressed to create a tar.gz.

In response to determining that the single object is an archive file, each of the bundled files is extracted from the archive file (508). For example, if the archive file is part of a MIME message, the interface backend 108 can parse the MIME element to identify one or more embedded bundled files. If the archive is a .tar.gz archive, the interface backend 108 can inflate and unarchive the file to produce all of the bundled files within the archive file.

In addition to the multiple bundled files to be stored, the archive file may include a metadata file with a defined name that is extracted from the archive. The metadata file includes access control information for each of the multiple bundled files and may be extracted when the other bundled files are extracted (510). When this file is present, the access control information for each of the multiple bundled files is extracted from the extracted metadata file (512). For example, the hosted storage system 120 may publish a standard to which all uploaded archive files must conform. As part of this standard, a pre-defined formatted and named metadata file can be used to specify access control information for each of the multiple bundled files. The access control information may specify, for example, object role and scope pairs, as discussed previously.

Each of the extracted files is stored separately in the hosted storage system such that each of the extracted files is separately accessible by the client system over the network (514). For example, the interface backend 108 may upload each of the extracted files in a data share 112 as an individual data object under encryption as described in 208-212 in connection with FIG. 2. For example, each of the extracted files may be assigned a unique bucket/filename combination that uniquely identifies the extracted file within the hosted storage system 120. In another example, each of the extracted files may be assigned a unique URI.

In some implementations, each of the bundled files has a filename designated in the archive file and the metadata file designates a common prefix. In such a case, the metadata is extracted from the archive, the common prefix is extracted from the metadata file, and the files are separately stored with a name that includes the common prefix and the filename designated for the extracted file in the archive file. The prefix may be a directory path in the hosted storage system or the client system or a tag in a flat file system, to name a few options. For example, the bundled files may have the file names "Mike.jpg," "Antonio.jpg," and "Manny.jpg." If the interface backend 108 extracts the common prefix "Portrait of" from the metadata file, the three files may be stored as "Portrait of Mike.jpg," "Portrait of Antonio.jpg," and "Portrait of Manny.jpg"

In some cases, the common prefix may specify a bucket within the hosted storage system 120. The use of a special character in the prefix may identify that the prefix is associated with a bucket. In the example of the three .jpg files above, if the common prefix is "Portraits/," the three files may be saved in a "Portraits" bucket and named "Mike.jpg," "Antonio.jpg," and "Manny.jpg." If the system supports naming hierarchies, the prefix could also indicate the top-level hierarchy (e.g. path to the folder in a system that supports hierarchical/nested folders) within which all the extracted objects are placed.

Access control lists are generated for each of the extracted files based on the extracted access control information (516) and each access control file is stored in association with the corresponding extracted file (518). For example, ACLs based on the extracted role and scope pairs extracted in 508 can be created and stored in association with each of the extracted files. Each of the ACLs may be used to define access permissions for the corresponding extracted file, as previously described.

Figure 6:
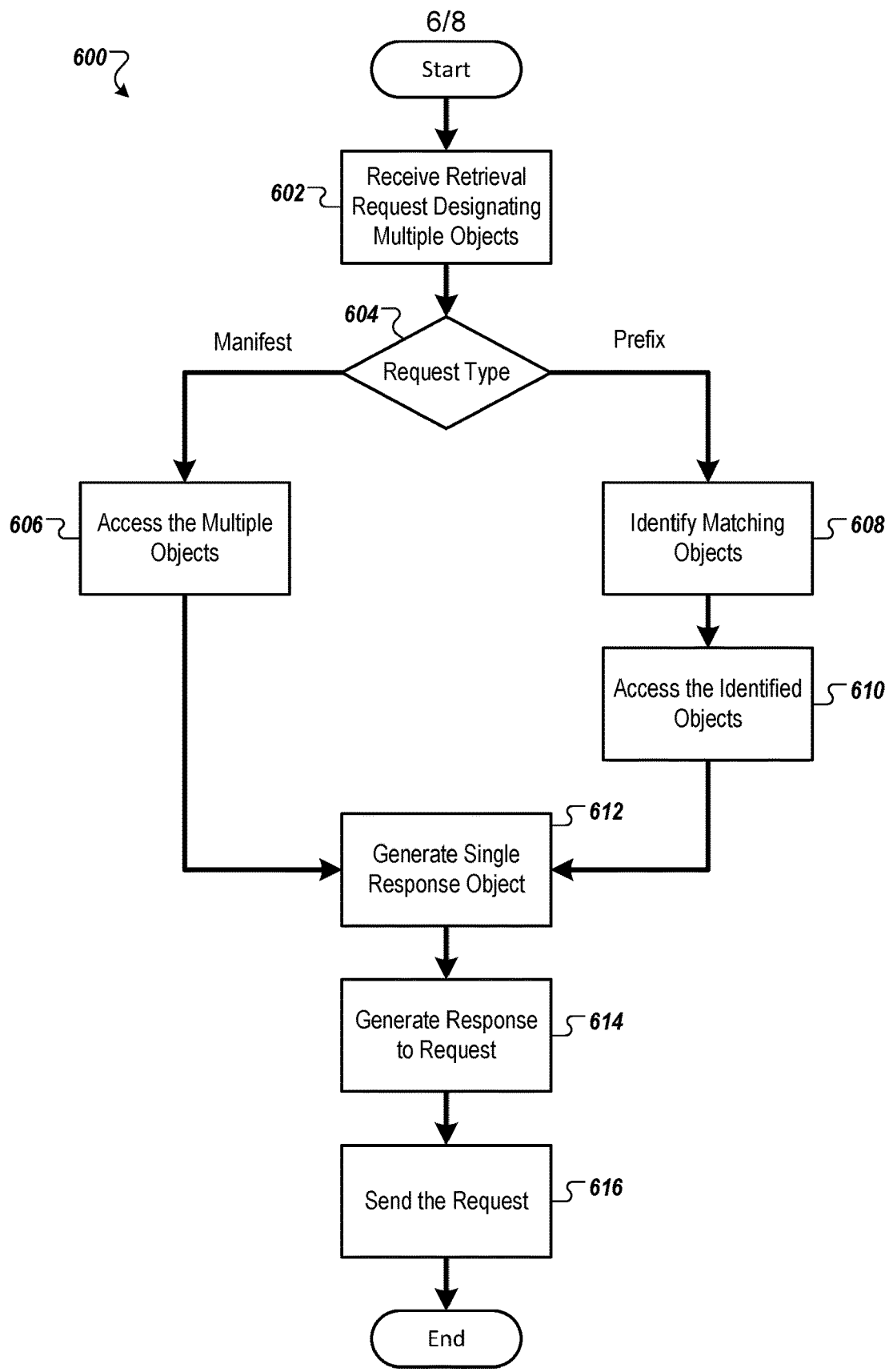
FIG. 6 is a flow chart showing an example of a process for responding to a request for multiple data objects to a hosted storage system.

FIG. 6 is a flow chart showing an example of a process for responding to a request for multiple data objects to a hosted storage system. The process can be performed by, for example, the interface frontend 106 and the interface backend 108, and for clarity of presentation, the description that follows uses the system 100 as the basis for describing the process. However, another system, or combination of systems, may be used to perform the process.

A retrieval request is received from a client system at the hosted storage system over the network (602). The retrieval request conforms to an API implemented by the hosted storage system for accessing storage services provided by the hosted storage system over the network. The API is designed to only support a single object in a response to the retrieval request. For example, the hosted storage system 120 may receive the retrieval request from the client 102 through an API implemented by the hosted storage system 120. The message may request that multiple objects be returned in a single archive and the message may include additional information. For example, the message may include a header or header, parameter, or flag that specifies the multiple objects being requested.

The request for multiple objects may take a variety of forms. If the request designates multiple objects (604), in response to receiving the retrieval request, the multiple objects designated in the retrieval request are accessed (606). For example, a manifest (e.g. a list of bucket/object name pairs) may individually designate multiple objects. In this case, the interface backend 108 may attempt to access each of the multiple objects designated. This access may be subject to, for example, access permissions defined in ACLs and may require decryption of the objects.

If the request designates a common prefix (604), in response to receiving the retrieval request, one or more objects that include the common prefix in the name of the object are identified and accessed (608). The prefix may be, for example, a directory path in the hosted storage system or the client system or may be a tag in a flat file system, to name a few options. The interface backend 108 can identify and access every stored object that the requesting user has access to and that match the specified prefix. Alternatively, the interface backend 108 may identify and access only those objects that are owned by the user. This alternative may prevent, for example, identifying publicly available objects that are not associated with the user.

A single response object is generated based on the accessed objects. The response object is an archive file that includes the accessed objects (612). For example, the interface backend 108 can group and archive all of the identified and accessed stored objects. The response object may be formed from certain standards, such as the MIME standard. Additionally or alternatively, the response object may be an archive file format such as .tar or .rar. The archive file format may or may not include compression. In some implementations, the hosted storage system 120 can support multiple archive formats. In such cases, some of the additional information in the access request may be an indicator of the type of archive to create. The request may also include a flag or parameter specifying whether or not the metadata for the matching objects should be returned. If the metadata is to be returned, this may be returned either combined in a manifest file that contains metadata for each object returned, along with an identifier that specifies which object a given set of metadata belongs (for example using a MIME formatted message), or the system could include generated files for each object that does not represent actual object in the storage system, but rather objects that are created as containers to send back the metadata for each object. These metadata files could be named using well-documented naming schemes to identify their purpose and the object to which they correspond. For example, server_object_name.metadata could be included in the archive under the same path hierarchy as the object it corresponds to.

A response to the retrieval request is generated that includes the response object (614), and the response to the retrieval request is sent to the client system over the network (616). For example, the hosted storage system 120 can return the response to the client 102 through the API. As previously mentioned, the API may support or require only a single object in messages passed, and the response may conform to this by including only the archive object. As such, multiple response objects may be passed through an API which supports or requires only a single object in passed messages.

The processes 500 and 600 may be used in a variety of use cases. In one use case, a software development team may use the hosted storage service 120 as a code repository. The client application 103 may allow users to check in, check out, and copy out code that is stored in the hosted storage service 120. When a user checks in new code, the client application 103 may append a new version prefix to each file, ensuring that the older versions of the code are still available. Later, code may be batch-checked out by specifying a version number. The client application 103 may then request all code that matches the version number prefix.

Another example use is in updating static contents for a website. Many websites use an off the shelf content management engine with a personalized skin that includes many files for look-and-feel (e.g., images, style sheets). In this example, the files of the skin may be stored in the hosted storage system 120 with a common prefix (e.g., "skin1") and referenced by the content management engine for use when rendering the website. Later, when the website owner wishes to edit this skin, the owner can request all files with the common prefix (e.g., "skin1") to gain access to all files associated with the skin. Once one or more of the files have been changes, the files may be uploaded with the same prefix and file names to overwrite the old version of the skin.

Still a third example use is in desktop backup. In this example, the client application 103 backs up the files of the client's 102 hard drive to the hosted storage system 120. The path of each file is used as a prefix for the file, so all documents in the directory "/importantdocs" would be stored by the hosted storage system 120 in a bucket called "importantdocs." Similarly, all documents in the directory "/importantdocs/banking" would be stored in a bucket "banking" nested within the bucket "importantdocs." Later, when the user wishes to access their backed up documents (e.g. in the event of a hardware failure of the client 102 or from a different device), the user may request all objects that match the prefix "importantdocs." The hosted storage system can respond to this request with an archive object that includes all documents within the "importantdocs" bucket as well as all documents within the "banking" bucket, as the "banking" bucket is within the "importantdocs" bucket.

Figure 7:
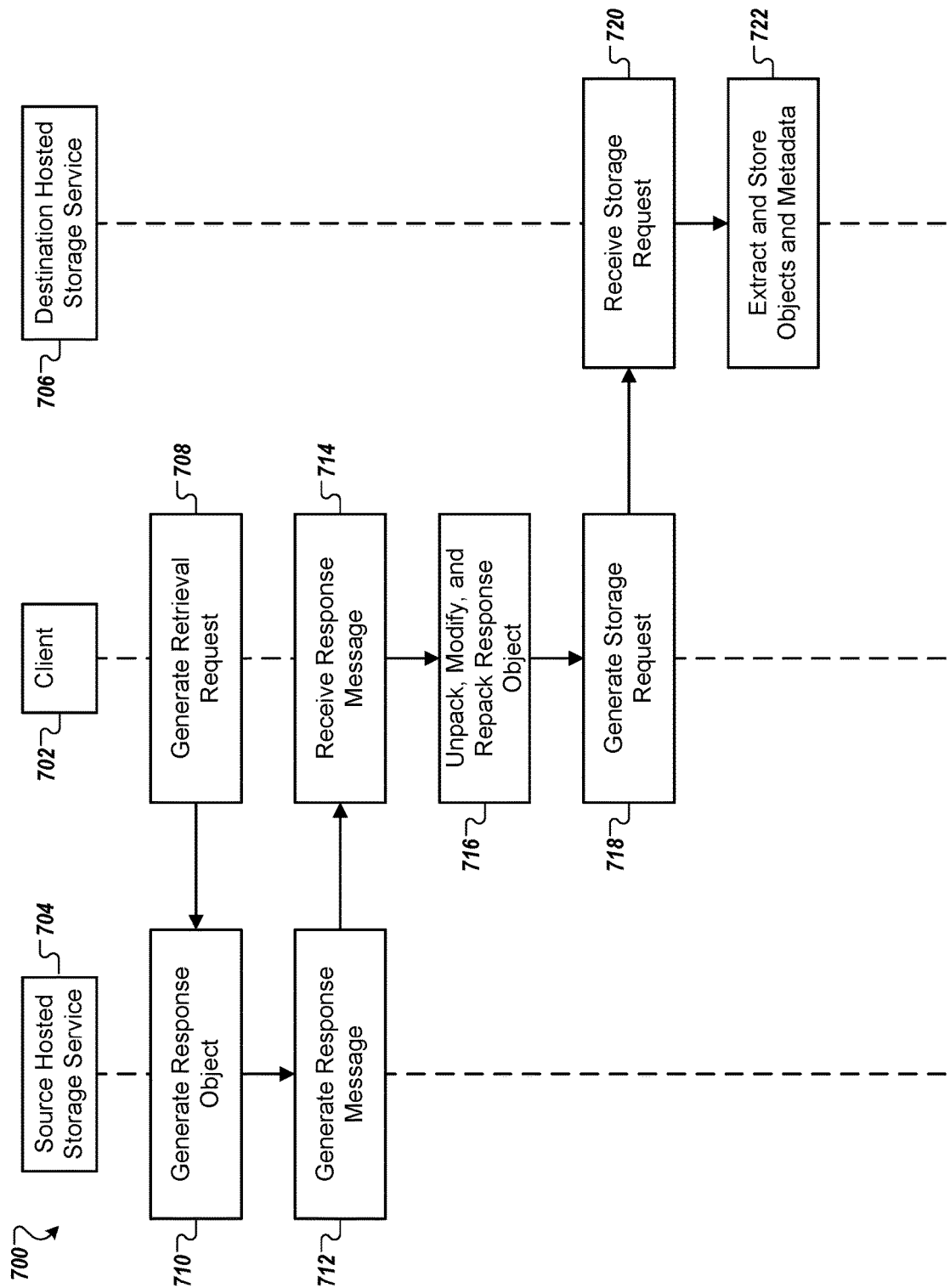
FIG. 7 is a sequence diagram showing an example of a process for transferring many data objects from one hosted storage system to another hosted storage system.

FIG. 7 is a sequence diagram showing an example of a process 700 for transferring many data objects from one hosted storage system to another hosted storage system. In this example, a client 702 is a computer system that is in communication with (e.g. via the Internet) a source hosted storage service 704 and a destination hosted storage service 706. The source hosted storage service 704 stores some data objects that are accessible by the client 702 and the destination hosted storage service 706 is configured to store data objects received from the client 702.

The process 700, or other similar processes, may be used in a number of situations where a user would like to transfer many data objects from one hosted storage system to another. In general, hosted storages service (e.g. the source hosted storage service 704 and the destination 706) that implement the appropriate portions of the process 700 can provide data portability to the user that owns the data in the hosted storage services. For example, a user may wish to terminate service with the source hosted storage service 704 and begin service with the destination hosted storage service 706. In this example, the user may, before service termination, extract the user's stored data objects from the source hosted storage service 704 and upload that data objects to the destination hosted storage service 706. As another example, a user may store some data objects—hosted storage service 704 may make the data unavailable, may wish to create a copy of the data objects within the destination hosted storage service 706. In still another example, the user may wish to make periodic backups of some or all of the data objects within the source hosted storage service 704.

In general, the client 702 and/or the source hosted storage service 704 and the destination storage service 706 are authorized by the user that owns the data to be transferred. For example, the client 704 may be a desktop application that the user runs, and the user may be authenticated by the source hosted storage service 704 and the destination storage service 706 before the process 700 begins. In another example, the client 702 may be a component of the destination hosted storage service 706, and the process 700 may be performed at the user's request after being authenticated by the source hosted storage service 704 and the destination storage service 706.

The client 702 can generate 708 a retrieval request for data objects stored in the source hosted storage service 704. The retrieval request conforms to an API implemented by the source hosted storage service 704 for accessing multiple data objects within the source hosted storage service 704. In some cases, the API implemented by the source hosted storage service 704 may permit only a single data object per request and/or response. In some such cases, the retrieval request for multiple data objects to be returned in a single archive file in a single response message. Alternatively, the client 702 may request multiple data objects according to different schemes. For example, the client 702 may send a series of retrieval requests, each requesting a single data object to be returned in a series of corresponding response messages. The client 702 can send the retrieval request or requests to the source hosted storage service 704, for example, via the Internet.

In response to receiving the retrieval request, the source hosted storage service 704 can generate 710 a response object for replying to the retrieval request. If the retrieval request designates multiple objects, the source hosted storage system 704 can access the multiple objects. If the request designates a common prefix, the source hosted storage system 704 can identify and access one or more objects that include the common prefix in the name of the object.

The source hosted storage service 704 can generate 712 a single response object that contains the identified and accessed objects. For example, the objects may all be added to a single archive file, which may or may not be compressed. Additionally, source hosted storage service 704 may also add, for example, metadata associated with the objects (e.g., bucket structure, filetype, timestamps, ACLs) to the response object.

The source hosted storage service 704 can generate 712 a response message that contains the response object and can return the response message to the client 702. The source hosted storage service 704 may pass the response message through an interface that, for example, specifies that each response message may contain only a single object. The response message could be passed through this interface, as the archive containing multiple stored objects is a single object.

The client 702 can receive 714 the response message and extract the response object from the response message. In some cases, the client 702 may unpack, modify, and/or repack the response object. In one example, the source hosted storage service 704 and the destination hosted storage service 706 may use different metadata protocols, and the client 702 can convert metadata stored in the response object so that the metadata can be used by the destination hosted storage service. Additionally, the client 702 may wish to add, remove, or modify one of the objects in the response object. For example, the client 702 may wish to create or modify a text file used to log the process 700. Once the response object is ready for transfer to the destination hosted storage service 706, the client 702 can generate 718 a storage request containing the modified response object. In other cases, the client 702 may generate 718 the storage request around the response object without altering the response object.

The client 702 can send the storage request to the destination hosted storage service 706, for example, via the Internet. The destination hosted storage service 706 may receive 720 the storage message through an interface that, for example, specifies that each storage message may contain only a single object. The storage message could be passed through this interface, as the archive containing multiple stored objects is a single object. The interface used by the destination hosted storage service 706 may be the same or different than the interface used by the source hosted storage service 704. Alternatively, the client 702 may submit for storage the multiple data objects according to different schemes. For example, the client 702 may send a series of storage requests, each requesting storage a single data object in a series of storage request messages.

Once received, the destination hosted storage service can extract and store 722 the objects and metadata from the single object of the storage request. For example, the destination hosted storage service 706 may uncompress and unarchive the object and store each data object according to the data object's associated metadata and/or name. If, for example, the object contains bucket structure metadata for the contained data object, the destination hosted storage service 706 can store the data objects according to the described bucket structure. This may allow, for example, the bucket structure of the data objects in the destination hosted storage service 706 to match the bucket structure of the source hosted storage service 704.

Variations to the process 700 are possible, for example based on the configurations of the source hosted storage service 704 and destination hosted storage service 706. For example, if the source hosted storage service 704 does not support bulk access to multiple data objects in a single retrieval request, the client 702 can access data objects from the source hosted storage service 704 individually in a series of retrieval requests. If the destination hosted storage service 706 does not support bulk storage of multiple data objects in a single storage request, the client 702 can send data objects to the destination hosted storage service 706 individually in a series of storage requests. The client 702 may be a computer system controlled by a user, or the client 702 may be a component of the source hosted storage service 704 and/or the destination hosted storage service 706. The source hosted storage service 704 may be owned, operated, and/or administered by the same or different organization that owns, operates, and/or administers the destination hosted storage service 706.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method when executed by data processing hardware causes the data processing hardware to perform operations comprising:
   receiving, from a remote client system, a storage request comprising a single data object, the storage request requesting storage of the single data object;
   determining that the single data object comprises plurality of data files, each of the plurality of data files comprising a respective name;
   extracting the plurality of data files from the single data object;
   determining a common prefix associated with each of the plurality of data files;
   for each corresponding data file of the plurality of data files:
      determining a filename for the corresponding data file by combining the common prefix with the respective name of the corresponding data file;
      associating the corresponding data file with the filename; and
      storing the corresponding data file with the filename in a storage bucket associated with the common prefix, the storage bucket not nested with any other storage bucket;
   after storing each of the plurality of data files, receiving, from the remote client system, a retrieval request comprising the common prefix;
   in response to receiving the retrieval request comprising the common prefix, generating a single response data object comprising each data file stored in the storage bucket associated with the common prefix; and
   sending the response data object to the remote client system.

2. The method of claim 1, wherein receiving the storage request comprises receiving the storage request through an application programming interface that is configured to return the single data object representing a single archive.

3. The method of claim 1, wherein determining the common prefix comprises extracting the common prefix from metadata of the single data object.

4. The method of claim 1, wherein each of the plurality of data files is associated with a corresponding access control list.

5. The method of claim 4, wherein generating the response data object comprises determining that a user associated with the remote client system is authorized to access each data file stored in the storage bucket associated with the common prefix based on the corresponding access control list.

6. The method of claim 4, wherein storing the corresponding data file comprises storing the corresponding access control list with the corresponding data file.

7. The method of claim 1, wherein the operations further comprise, after storing each of the plurality of data files:
   receiving, from the remote client system, a second retrieval request designating the common prefix;
   identifying each of the plurality of stored data files associated with the common prefix;
   generating a second response comprising each of the plurality of identified stored data files; and
   sending the second response to the remote client system.

8. The method of claim 1, wherein the common prefix includes a directory path that identifies a particular directory.

9. The method of claim 1, wherein the single data object includes a .tar archive file format or a .rar archive file format.

10. A system comprising:
    data processing hardware; and
    memory hardware in communication with the data processing hardware, the memory hardware storing instructions that when executed on the data processing hardware cause the data processing hardware to perform operations comprising:
       receiving, from a remote client system, a storage request comprising a single data object, the storage request requesting storage of the single data object;
       determining that the single data object comprises a plurality of data files, each of the plurality of data files comprising a respective name;
       extracting the plurality of data files from the single data object;
       determining a common prefix associated with each of the plurality of data files;
       for each corresponding data file of the plurality of data files:
          determining a filename for the corresponding data file by combining the common prefix with the respective name of the corresponding data file;
          associating the corresponding data file with the filename; and
          storing the corresponding data file with the filename in a storage bucket associated with the common prefix, the storage bucket not nested with any other storage bucket;
       after storing each of the plurality of data files, receiving, from the remote client system, a retrieval request comprising the common prefix;
       in response to receiving the retrieval request comprising the common prefix, generating a single response data object comprising each data file stored in the storage bucket associated with the common prefix; and
       sending the response data object to the remote client system.

11. The system of claim 10, wherein receiving the storage request comprises receiving the storage request through an application programming interface that is configured to return the single data object representing a single archive.

12. The system of claim 10, wherein determining the common prefix comprises extracting the common prefix from metadata of the single data object.

13. The system of claim 10, wherein each of the plurality of data files is associated with a corresponding access control list.

14. The system of claim 13, wherein generating the response data object comprises determining that a user associated with the remote client system is authorized to access each data file stored in the storage bucket associated with the common prefix based on the corresponding access control list.

15. The system of claim 13, wherein storing the corresponding data file comprises storing the corresponding access control list with the corresponding data file.

16. The system of claim 13, wherein the operations further comprise, after storing each of the plurality of data files:
    receiving, from the remote client system, a second retrieval request designating the common prefix;
    identifying each of the plurality of stored data files associated with the common prefix;

generating a second response comprising each of the plurality of identified stored data files; and sending the second response to the remote client system.

17. The system of claim 10, wherein the common prefix includes a directory path that identifies a particular directory.

18. The system of claim 10, wherein the single data object includes a .tar archive file format or a .rar archive file format.

* * * * *